(12) United States Patent
Sepe et al.

(10) Patent No.: US 10,969,303 B2
(45) Date of Patent: Apr. 6, 2021

(54) METHOD AND SYSTEM TO MONITOR THE HEALTH STATUS OF A ROLLING BEARING OF A MACHINERY, AND MACHINERY EQUIPPED WITH SAID SYSTEM

(71) Applicant: NUOVO PIGNONE TECNOLOGIE SRL, Florence (IT)

(72) Inventors: Marzia Sepe, Florence (IT); Riccardo Garbin, Florence (IT); Senthilkumar Datchanamoorthy, Bengaluru (IN); Ravi Yoganatha Babu, Bengaluru (IN); Vinod Reddy, Bengaluru (IN); Gilbert Scott Reveille, Lebanon, OH (US); Kotesh Kummamuri Rao, Pearland, TX (US)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 193 days.

(21) Appl. No.: 16/302,020

(22) PCT Filed: May 22, 2017

(86) PCT No.: PCT/EP2017/062227
§ 371 (c)(1),
(2) Date: Nov. 15, 2018

(87) PCT Pub. No.: WO2017/202753
PCT Pub. Date: Nov. 30, 2017

(65) Prior Publication Data
US 2019/0145856 A1    May 16, 2019

(30) Foreign Application Priority Data
May 24, 2016   (IT) .................... 102016000053256

(51) Int. Cl.
*G01M 13/045*    (2019.01)
*F16C 19/52*     (2006.01)
(Continued)

(52) U.S. Cl.
CPC ......... *G01M 13/045* (2013.01); *F16C 19/527* (2013.01); *G01H 1/003* (2013.01); *G05B 23/0235* (2013.01)

(58) Field of Classification Search
CPC ... G01M 13/045; G01M 13/04; F16C 19/527; F16C 19/52; G01H 1/003; G01H 1/14; G05B 23/0235
(Continued)

(56) References Cited

U.S. PATENT DOCUMENTS 5,115,671 A  *  5/1992  Hicho .................. G01H 1/00
                                                    73/660
9,032,803 B2    5/2015  Griffaton
(Continued)

FOREIGN PATENT DOCUMENTS

| EP | 2365310 A1 | 9/2011 | |
|---|---|---|---|
| EP | 3029449 A1 * | 6/2016 | ......... G01M 13/045 |
| WO | 2015015987 A1 | 2/2015 | |

OTHER PUBLICATIONS

PCT Search Report and Written Opinion issued in connection with corresponding Application No. PCT/EP2017/062227 dated Aug. 3, 2017.

*Primary Examiner* — Lisa M Caputo
*Assistant Examiner* — Rose M Miller
(74) *Attorney, Agent, or Firm* — Baker Hughes Patent Org.

(57) ABSTRACT

A method to monitor the health status of a rolling bearing of a machinery, including a first acquiring step of a rotation speed value of a shaft coupled to the rolling bearing, a
(Continued)

second acquiring step of a first signal generated by a vibration sensor located on the machinery in a position distant from the rolling bearing, and a first calculating step of a variation of the shaft rotation speed value during a predetermined time interval, and if the calculated variation of the rotation speed falls within a predetermined variation interval, performing a first filtering step of the first signal with a first algorithm based on a vibration produced by parts of the machinery different from the bearing at the rotation speed value, so as to obtain a second signal representative of a bearing health status.

15 Claims, 5 Drawing Sheets

(51) Int. Cl.
    *G01H 1/00*     (2006.01)
    *G05B 23/02*     (2006.01)

(58) Field of Classification Search
    USPC .................................. 73/593, 587, 659, 660
    See application file for complete search history.

(56) References Cited

U.S. PATENT DOCUMENTS

| | | | |
|---|---|---|---|
| 2004/0138832 A1* | 7/2004 | Judd ....................... | G06F 19/00 702/56 |
| 2008/0033695 A1* | 2/2008 | Sahara et al. ......... | G01M 13/04 702/185 |
| 2010/0280772 A1* | 11/2010 | Saarinen et al. ........ | G06F 17/18 702/56 |
| 2011/0251804 A1* | 10/2011 | Hess et al. ................ | G01P 3/00 702/56 |
| 2013/0096848 A1* | 4/2013 | Hatch et al. ............ | G06F 19/00 702/39 |
| 2014/0039809 A1* | 2/2014 | Girondin et al. .. | G01N 29/4463 702/39 |
| 2016/0223496 A1 | 8/2016 | Klos et al. | |

* cited by examiner

METHOD AND SYSTEM TO MONITOR THE HEALTH STATUS OF A ROLLING BEARING OF A MACHINERY, AND MACHINERY EQUIPPED WITH SAID SYSTEM

TECHNICAL FIELD

Embodiments of the subject matter disclosed herein correspond to a method to monitor the health status of a rolling bearing of a machinery, to a system to monitor the health status of a rolling bearing of a machinery and to a machinery equipped with said system.

In particular, the machinery may be a turbomachinery.

BACKGROUND OF THE INVENTION

In the field of 'Oil and Gas', as well as in the field of 'Power', machinery like compressor or turbomachinery in general are widely used.

Those kinds of machineries comprise rotating parts, like shafts, that may be mounted on rolling bearings. Rolling bearings comprise a plurality of rolling elements, which may be balls or cylinders, located between an outer ring and an inner ring. The rolling elements may rotate on an inner race and an outer race respectively formed on the inner ring and on the outer ring.

In order to lubricate and refrigerate the bearings, the machinery may be equipped with a lubricating circuit, feeding lubricant to the each bearing. The lubricant draining form the bearing may gather in a sump structure surrounding the bearing and then may be recirculated in the lubricating circuit.

Rolling bearing faults or malfunctioning may lead to serious damages, especially in turbomachines. Here, impellers or turbines are mounted on the shaft with a minimal distance from a stator, in order to operate correctly and efficiently. If a rolling bearing breaks, impellers and other rotating components may contact the stator leading to a severe damage of the entire machinery.

As bearing health is so critical, different systems are used to monitor the health of a rolling bearing.

When a rolling bearing is damaged, its temperature increases. In addition, a damaged bearing may generate important vibrations that may add on to the vibration of the whole machinery. Moreover, wear and tear in the bearing can cause small metal chips to break (in particular races and rolling parts) and may flow in the lubricating circuit together with the lubricating fluid.

Baseline values of healthy systems are used to monitor the bearing temperature, overall machinery vibration and the quantity of chips present in the scavenge line of the lubricating circuit.

The values of monitored parameters may change significantly only when the bearing is severely damaged.

Therefore, the known monitoring systems may not be able to correctly diagnose a rolling bearing problem at an initial stage of bearing malfunction.

SUMMARY OF THE INVENTION

Therefore, there is a general need for an improved method and system to monitor the health status of a rolling bearing of a machinery.

The method and system are particularly useful when implemented on turbomachinery.

An important idea is to monitor the health status of a rolling bearing acquiring a first signal collected by a vibration sensor installed on the machinery, and filter it with a filtering algorithm that removes from the signal the vibration produced by parts of the machinery different from that generated by the monitored bearing.

One embodiment of the subject matter disclosed herein corresponds to a method that monitors the health status of a rolling bearing.

Another embodiment of the subject matter disclosed herein corresponds to a system that monitors the health status of a rolling bearing.

An additional embodiment of the subject matter disclosed herein corresponds to a machinery, in particular a turbomachinery, equipped with a system to monitor the health status of a rolling bearing

BRIEF DESCRIPTION OF THE DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit embodiments of the invention. Instead, the scope of embodiments of the invention is defined by the appended claims.

Figure 1:
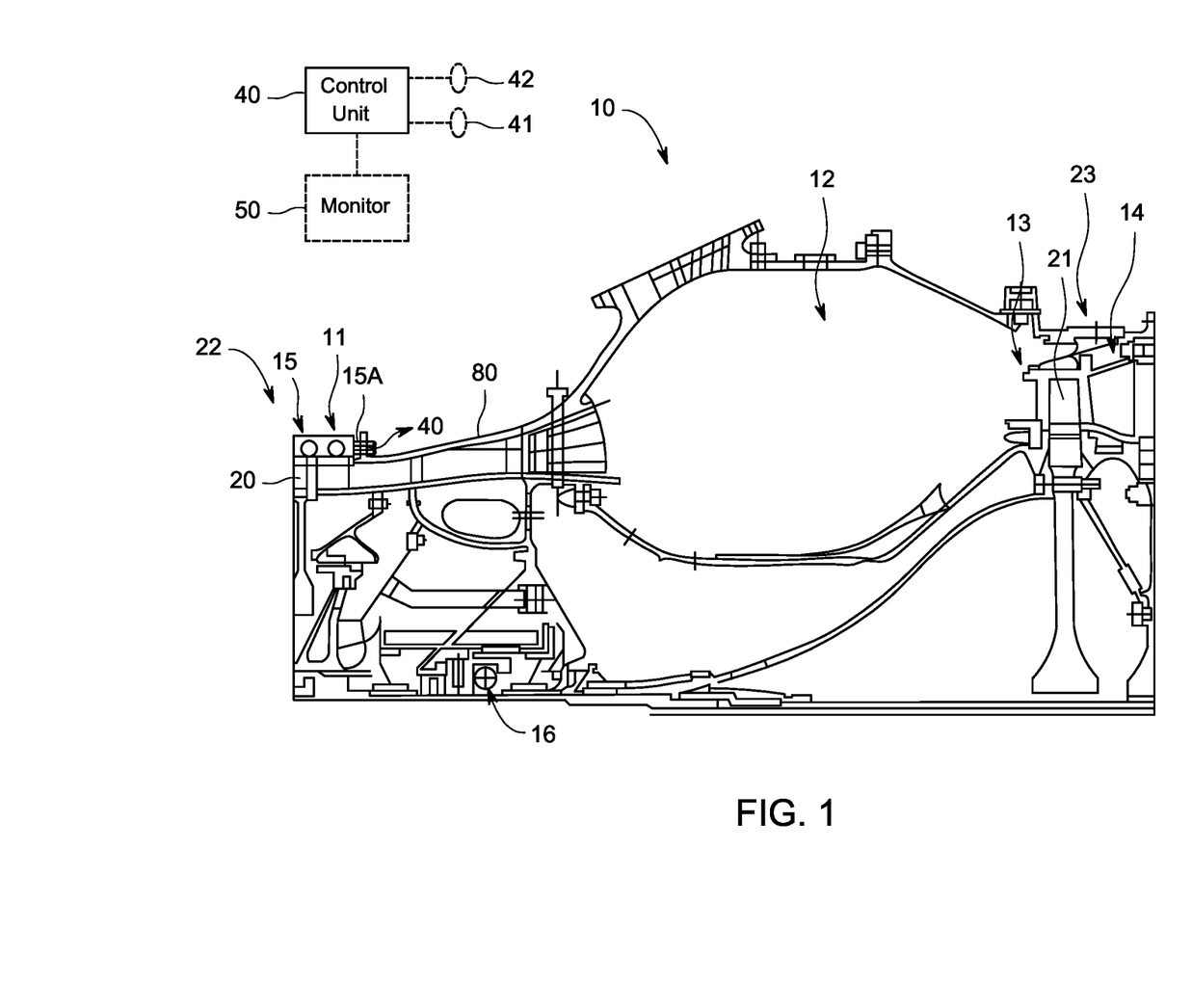
FIG. 1 schematically shows a machinery, and in particular a part of a turbomachinery that comprises a compressor and a turbine in the proximity of a burner.

With particular reference to FIG. 1, reference 10 overall indicates a machinery, in particular a turbomachinery, and more in particular a gas turbine.

The turbomachinery 10 may comprise an axial air compressor 22 driven by a turbine 23. The compressor 22 may comprise a plurality of compressor blades 20, and the turbine may comprise a plurality of turbine blades 21. Both the compressor 22 and the turbine 23 may comprise a plurality of compressor or turbine stages (not shown in the drawings). The compressor blades 20 and the turbine blades 21 are mounted on a common shaft 18.

The turbine blades 21 shown in FIG. 1, may cooperate with turbine nozzles 13 and stator nozzles 14 in order to operate correctly.

The shaft 18 may be supported by a rolling bearing 16 located between the axial compressor 22 and the turbine 23 and by a further bearing (not shown) located at an inlet of the axial compressor 22, in the proximity of a burner 12. Other bearings (not shown) may support the shaft 18.

The rolling bearing 16 may be refrigerated and lubricated by oil flowing in a scavenge line 19 in fluid contact with the rolling bearing 16.

Figure 2:
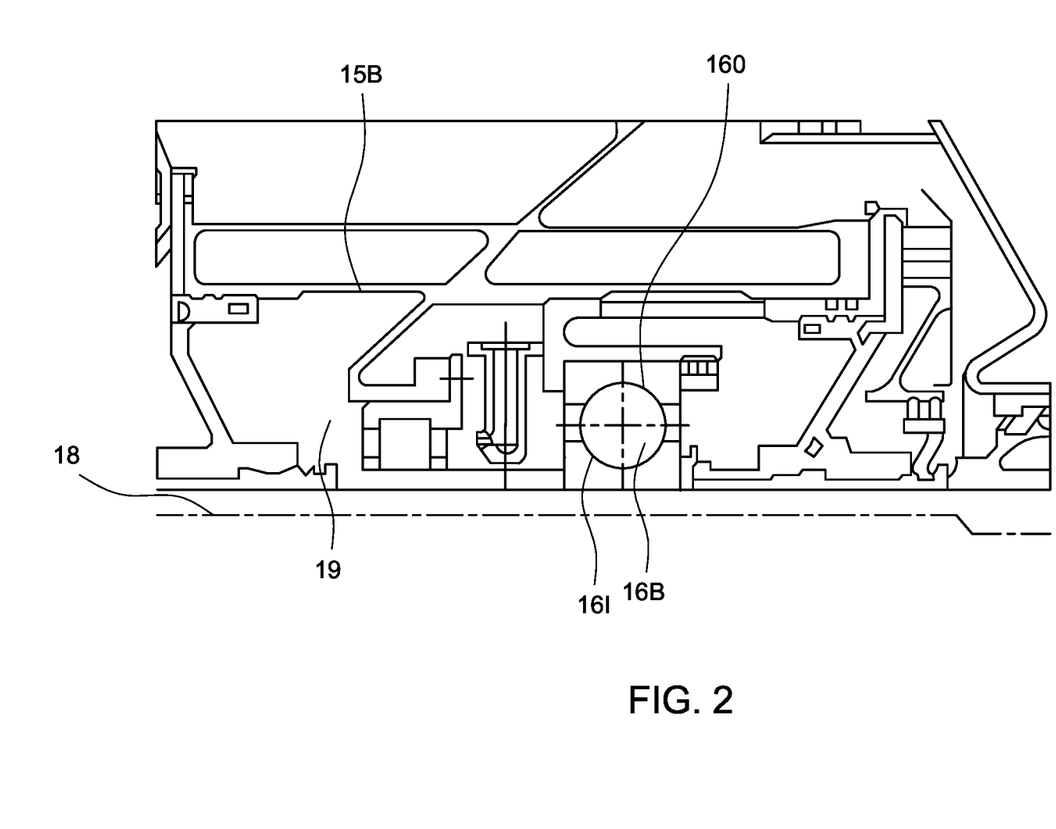
FIG. 2 is an enlarged view of a particular of FIG. 1, that shows the bearing in detail.

The bearing may also comprise an outer race 16O, which may be coupled to a stator, and an inner race 16I, which may be coupled to the shaft 18. Between the inner race 16I and the outer race 16O a plurality of bearing balls 16B is located.

A vibration sensor 11 may be mounted on a compressor rear stator assembly 15, in the proximity of the compressor rear frame and, in an embodiment, on an outer casing 80 of the machinery. The vibration sensor 11 may monitor the health status of the rolling bearing 16.

As it may be noticed, the position of the vibration sensor 11 is distant from the turbine bearing 16, so that it may be easier to access it in case of maintenance. In the present description, the term 'distant' should be interpreted as 'not in direct contact' with any part of the bearing 16.

By way of example the sensor 11 may be located on the casing 80 of the machinery, in an embodiment, on an external flange 15A of it, or at a sump structure 15B. The sensor 11 may also be located in correspondence of any other component of the sump/bearing assembly.

According to one embodiment, the vibration sensor 11 may be an accelerometer having a wide bandwidth with upper cut-off frequency >10 kHz in order to capture all the spectral components of the vibrations generated by a possible malfunction of the bearing 16.

As an example the accelerometer 11, may be of piezoelectric type or of the acoustic type, as well as piezoresistive, capacitive, MEMS or strain gauge type.

The vibration sensor 11 may transmit a signal S1 to a machinery control unit 40 coupled to it. The machinery control unit 40 is also coupled with a speed sensor 41 designed to read the rotating speed of the shaft 18. The speed sensor 41 may be of any known type, for example a keyphasor, a hall effect sensor, a stroboscope sensor etc.

The control unit 40 may also be coupled with a monitor 50 (for example a touch screen video or a control panel of the machinery), which may show alerts and/or any other kind of information for controlling the operating status of a machinery. Furthermore the control unit may be coupled with a debris sensor 42 placed in the scavenge line 19.

The control unit 40 may be configured to monitor the health status of the rolling bearing 16 based on the signal S1 acquired by the vibration sensor 11, and the shaft speed value measured by the speed sensor 41.

In the present description, reference will be made to the steps necessary to monitor the rolling bearing 16, although the machinery may have other vibration sensors positioned on the machinery to monitor the status of other rolling bearings.

Furthermore the control unit 40, may show on the monitor 50, the information regarding the health status of the rolling bearing 16, obtained on the basis of the signal collected by the vibration sensor 11, and the signal acquired by the speed sensor. More in particular, the information regarding the health status may relate to a damage present on the inner race of the bearing, on the outer race of the bearing, or on the bearing ball. An alarm may be also generated and displayed on the monitor 50.

Figure 3:
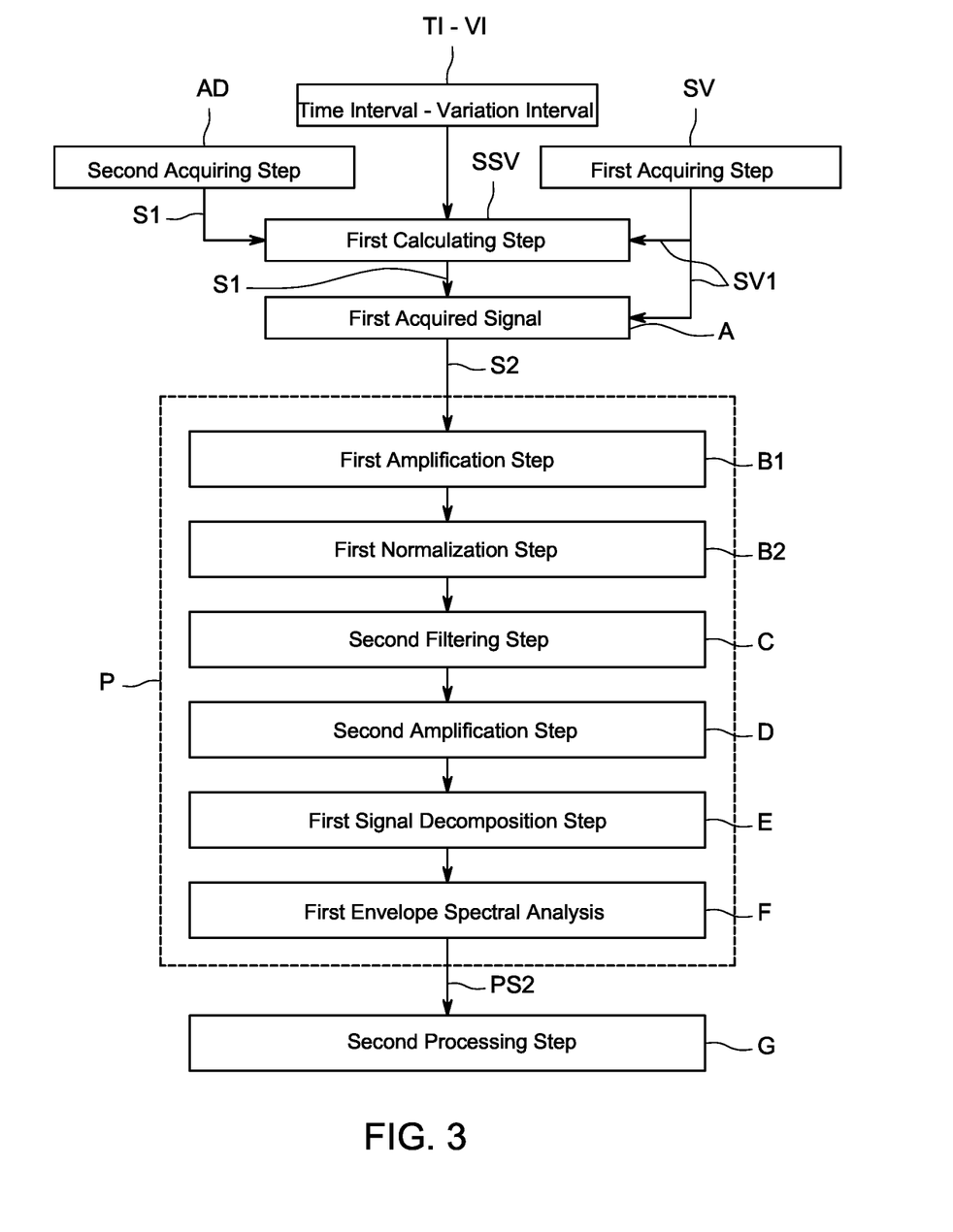
FIG. 3 is a schematic view of a plurality of steps of a method to monitor the health status of a rolling bearing, for example, of the rolling bearing shown in FIG. 2.

The method performed by the control unit 40 may comprise the following steps (reference is made to FIG. 3):

a. a first acquiring step SV of a rotation speed value SV1 of the shaft 18 coupled to the rolling bearing 16, b. a second acquiring step AD of a first signal S1 acquired by a vibration sensor 11 located on the machinery 10 mounted in a position distant from the rolling bearing 16, and c. a first calculating step SSV, to verify if a variation of the shaft rotation speed during a predetermined time interval TI falls within a predetermined variation interval VI, and if the variation falls within the predetermined interval TI, d. performing a first filtering step A of the first signal with a first algorithm based on a vibration produced by parts of the machinery different from the bearing at the said rotation speed value SV1, so as to obtain a second signal S2 representative of a bearing health status.

By way of example, the first calculating step SSV may proceed with the algorithm if the speed variation within TI is below a predefined threshold. In a numeric example, the parameter VI may be set to 0.2 shaft revolutions, while the time interval TI may be 1 second.

The first filtering step A may operate with the following algorithm;

A1. transform the first signal S1 from the time domain to the frequency domain (for example by calculating the Fast Fourier Transform (FFT) of first signal S1, or by any other known method) and A2. cancel vibrations produced for example by the shaft 18 and the machinery parts rotating with the shafts (for example: frequency components $N*fsh \pm I$ Hz, where fsh is the shaft speed SV1 in rev/sec and I is a parameter that may be fixed or dependent from N), A3. optionally transform the processed signal back to time domain (for example again with an IFFT)

so as to obtain a second signal S2.

As an example the parameter I, may be 3 Hz. In another example the parameter I may be $I=f(N)$. Specifically, the parameter I may be used to take into account the spread of the shaft order components occurring due to computational inaccuracy related to finite order of the Fast Fourier Transform.

The filtering step A may give as an output a second signal S2 that may be further processed by a first processing step P to obtain a third signal PS2 representative of a bearing health status.

Figure 4:
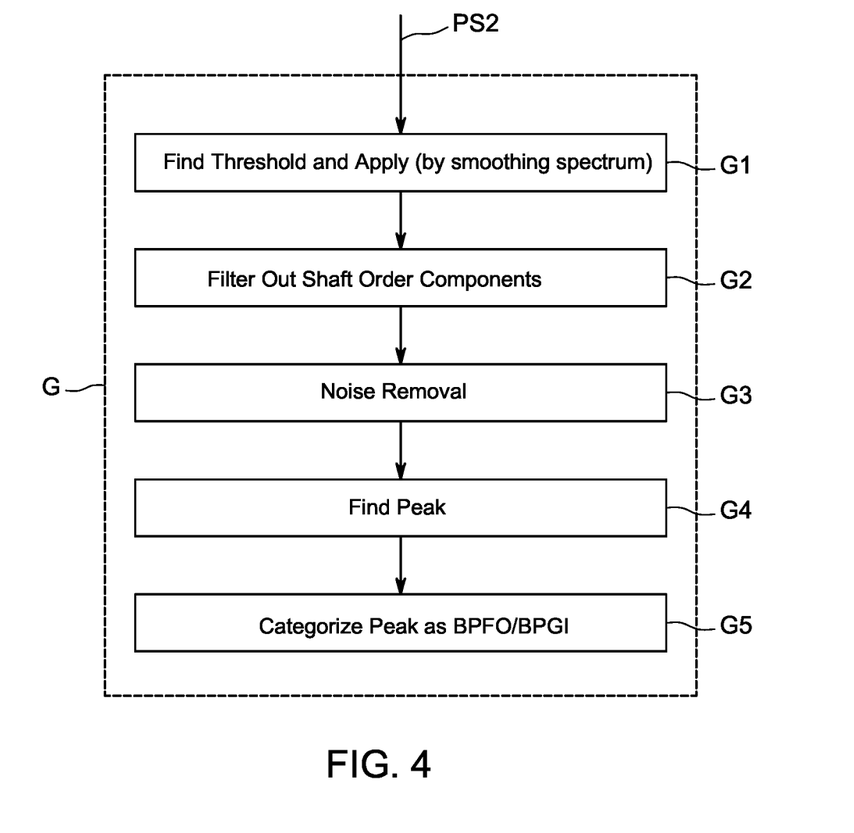
FIG. 4 is a schematic view of further steps of the method of FIG. 3.

The first processing step P may comprise a first amplification step B1 to amplify frequencies with periodic behavior of the second signal S2 thereby reducing noise.

This first amplification step B1 may be performed with spectral averaging techniques, for example with the following procedure:

B1-1. perform a segmentation of the signal S2, in an embodiment, applying an overlap O (in one example the overlap O may be of 40 percent)

B1-2. transform each segment of the signal from the time domain to the frequency domain (for example by calculating the Fast Fourier Transform (FFT), or by any other known method) and B1-3. estimate P1th percentile of magnitude of signal spectrum (for example P1-50th percentile)

B1-4. replace the frequency domain magnitude of each segment by P1th percentile magnitude B1-5. transform the processed signal back to time domain (for example again with an IFFT) processed B1-6. reconstruct the signal by overlap and add method.

The value of P1th may be selected based on the variation of the strength of the signal across different segments. If the signal strength is consistent across 50 percent of the segments, then 50th percentile may be selected.

The first processing step P may also comprise a first normalization step B2, to regulate the strength of the different frequency components across different frequency bands. This step may be particularly useful for the identification of a bearing defect.

The first normalization step B2 may be performed, as an example, by the following procedure:

B2-1. transform the signal from the time domain to the frequency domain (for example by calculating the Fast Fourier Transform (FFT) of first signal S1, or by any other known method)

B2-2. find peak magnitude for every frequency band, of a predetermined frequency FR (for example FR may be 1400 Hz, but the value of FR may be set to the expected ball pass frequency calculated theoretically).

B2-3. interpolate the peak values to get the division factor for normalizing the signal.

B2-4. divide each component in the frequency domain by the factor obtained by interpolation of peak values B2-5. transform the processed signal back to time domain (for example again with an IFFT)

The first processing step P may also comprise a second filtering step C performed with a pass-band algorithm, which may be performed, by way of example, with the following procedure:

C-1. choose band pass filter specifications such that it will cover all the fault frequency components and reject all other frequency bands;

C-2. apply band pass filter on the vibration signal.

The first processing step P may further comprise a second amplification (step D) to amplify impulsive components of the signal. The second amplification step may be for example a blind deconvolution.

By way of example, the second amplification step D may be performed by the following procedure:

D-1. choose filter length FL (which may be between 1 and 2 times the decay time constant of the impulsive fault signature).

D-2. calculate autocorrelation values for shifts 0, 1, . . . , FL-1.

D-3. Calculate weighted toeplitz autocorrelation matrix and find its inverse (A_inv).

D-4. initialize filter with coefficients (0, 1, 0, 0, . . . , 0).

D-5. apply filter on the input signal x and get the output signal y.

D-6. calculate weighted cross-correlation vector by shifting the input signal from 0 to FL-1.

D-7. update the filter coefficients: f=A_inv*Weighted_Cross_Corr_Vect.

D-8. repeat steps D-5 to D-7 until max iterations or the kurtosis of y is constant.

The first processing step P may also comprise a first signal decomposition step E, which may be as a way of example a Wavelet Decomposition. It may be performed, as an example, by the following procedure:

E-1. Choose the number of decomposition levels

E-2. Decompose the signal into different frequency ranges based on the decomposition level The fault signature may be very strong in certain frequency bands and other frequency bands may have higher noise. After decomposition, the fault signature may be present in more than one decomposed signal. Hence, all decomposed signals are checked for the presence of fault components.

The first processing step P may also comprise a first envelope spectral analysis F. It may be performed on each decomposed signal, as an example, by the following procedure:

F-1. apply band pass filter on each wavelet decomposed signal in the previous step F-2. rectify the signal to get the envelope.

F-3. divide the signal into a number (for example 4) of segments and calculate FFT of each segment.

F-4. check each FFT magnitude variation among different segments and suppress the component that shows variation greater than a threshold (for example 20%).

The steps discussed above that are part of the first processing step P, may be performed in any sequence. The sequence may also exclude the first normalization step B2 when trying to detect a defect on the outer race of the bearing, or any other step.

After processing the second signal S2 as above described, thereby obtaining a third signal PS2, a second processing step G may be performed, in order to detect the presence of defect pattern in the signal related to a bearing malfunction.

The third signal PS2 is processed through one or more of the followings steps, in an embodiment, in sequence.

G1. Find Threshold and Apply (by smoothing of spectrum)

This step may be performed by the following sub-steps:

G-1a. Smooth the envelope spectrum, for example using approaches like moving average or local regression.

G-1 b. Select a dynamic threshold based on the noise level of the envelope spectrum. Typically, the threshold may be 2 to 3 times the average noise level obtained after smoothing the envelope spectrum.

G-1 c. Apply the threshold and exclude the components below the threshold.

G2. Filter out shaft order components (where shaft components are known because shaft speed is an input parameter).

This step may be performed by cancelling vibrations produced by the shaft 18 and the machinery parts rotating with the shafts (for example: frequency components N*fsh±Ie Hz, where fsh is the shaft speed SV1 in rev/sec and Ie is a parameter with a fixed value, or a value dependent from the shaft speed), G3. Noise Removal (to retain only the strong components of the signal)

This step may be performed by excluding the weak frequency components and retaining only 3 to 5 percent of the strong components G4. Find Peak It may be performed by finding the frequency corresponding to each of the strong peaks or components identified above.

G5. Categorize Peak as BPFO/BPFI

It may performed by the following procedure:

G5-a. For each peak closer to the theoretical frequency of the outer race defect, check for the presence of harmonics. If the peak and its harmonic is present then categorize as outer race defect.

G5-b. For each peak closer to the theoretical frequency of the inner race defect, check for the presence of harmonics and side bands at multiples of shaft speed. If the peak and its harmonic and/or sidebands are present then categorize as inner race defect.

The steps discussed above that are part of the second processing step G, may be performed in any sequence. The sequence may also exclude one or more of the steps, or include steps not described.

If during the above described procedure, a defect is identified, (i.e. damage present on the inner race of the bearing, or on the outer race of the bearing) an alarm may be generated.

Figure 5:
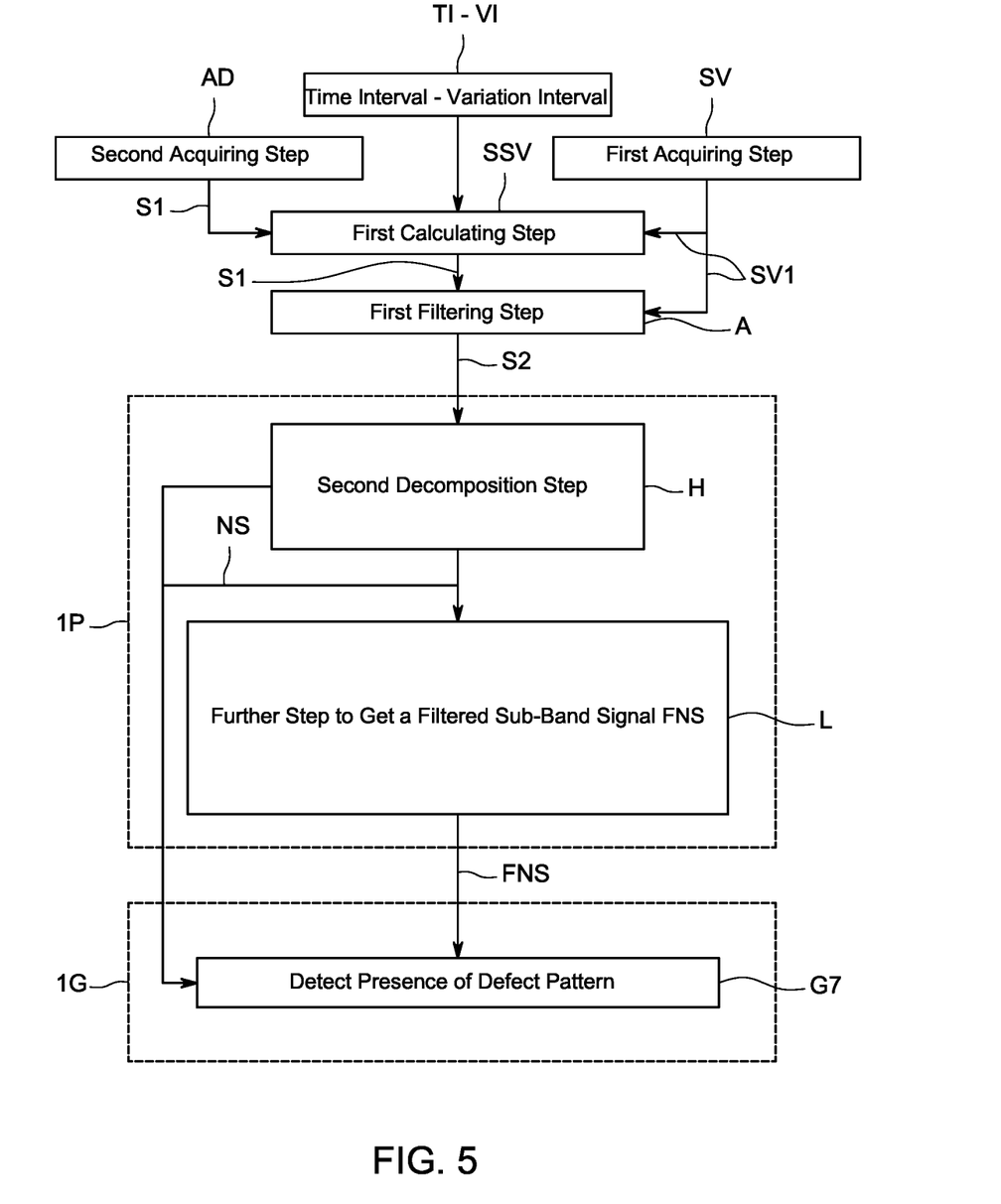
FIG. 5 is a schematic view of a plurality of steps relating to a different embodiment of a method to monitor the health status of a rolling bearing, for example, the rolling bearing shown in FIG. 2

FIG. 5, shows a different embodiment of a method to monitor the health status of a rolling bearing, for example the rolling bearing 16 of FIG. 1. This embodiment may be particularly useful to detect defects on the balls of the bearing, but it may be also used to detect outer race or inner race defects, using appropriate parameters and frequencies.

The first steps of the method are identical to the ones described with reference to FIG. 3, therefore they will not be described again, and reference is made to the description here above.

In the present embodiment, the first filtering step A, may be slight different from the one previously described, as it may operate with the following algorithm;

A1. transform the signal S1 from the time domain to the frequency domain (for example by calculating the Fast Fourier Transform (FFT) of first signal S1, or by any other known method) and A2. cancel vibrations produced for example by the shaft 18 and the machinery parts rotating with the shafts (for example: frequency components N*fsh±I Hz, where fsh is the shaft speed SV1 in rev/sec and I is a parameter that may be fixed or dependent from N), The filtering step A may give as an output a second signal S2 in the frequency domain, which may be further processed by a first processing step 1P to obtain a third signal FNS representative of a bearing health status.

More in particular the first processing step 1P may comprise the following steps.

H. Second decomposition step:

the spectrum of the signal S2 may be decomposed into non-overlapping sub-bands, to obtain a plurality of sub-band signals NS. Subsequently, each sub-band signal NS may be observed for the presence of faults, as it will be discussed later.

The bandwidth for each sub-band can be equal to or greater than a multiple (harmonics) of the ball spin frequency bsf and its sidebands, for example six harmonics and six sidebands per harmonic.

L. Further step:

for each sub-band signal NS, the frequencies different from multiples of the ball spin frequency bsf along with sidebands at multiples of the cage frequency cs are set to zero, in order to get a filtered sub-band signal FNS.

In particular, the further step L, may be performed by creating a vector $\tilde{X}_{bf}$ according to the following compound arithmetic progression:

$$\tilde{X}_{bf} = \begin{cases} X_{bf}, & f = f_{off} + \sum_{m=1}^{M}\left(mf_{bsf} + \sum_{n=-3}^{3} nf_{cg}\right) \\ 0, & \text{otherwise} \end{cases}$$

Wherein:

$X_{bf}$ is the original sub band signal NS $f_{off}$ the frequency offset parameter that identifies the compound arithmetic progression model fit within the sub band under consideration. The search range can be set from the starting frequency of the sub band to the starting frequency plus theoretical BSF.

$f_{bsf}$ is the expected ball spin frequency $f_{cg}$ is the expected cage frequency Basically, the vector $\tilde{X}_{bf}$ is constructed varying fbsf and fcg in a range of expected frequencies, obtained from experimental and filed tests.

The steps discussed above that are part of the first processing step 1P, may be performed in any sequence. The sequence may also exclude one or more of the steps, or include steps not described.

After the first processing step 1P, a second processing step 1G may be performed on each third signal FNS.

In the second processing step 1G, each filtered sub-band signal (which may be the vector $\tilde{X}_{bf}$) may be compared with the original sub-band signal NS (which may be the vector Xbf), in order detect the presence of the defect pattern (G7).

The comparison may be performed by calculating the value of ρ as defined below.

$$\rho(f_{off}, f_{bsf}, f_{cg}) = \frac{\|\tilde{X}_{bf}\|^2}{\|X_{bf} - \tilde{X}_{bf}\|^2}$$

If ρ is greater than a dynamic threshold calculated on the basis of different parameters of the signal (for example the signal energy, Kurtosis, RMS etc.) the defect pattern may be detected.

When a defect pattern is detected, all or some of the preceding steps already discussed for the previous embodiment, may be performed.

The steps discussed above that are part of the second processing step 1GP, may be performed in any sequence. The sequence may also exclude one or more of the steps, or include steps not described.

When applying the procedure described for this embodiment, to the identification of defects that may be present on the inner race or on the outer race, a slightly different approach may be used in the construction of the vector $\tilde{X}_{bf}$, which may be based on expected frequencies relating to the inner or outer race, and/or on the expected cage frequency.

If, through one of the method described above, a defect on the bearing (defect pattern) is identified, it is possible to further assess the total debris mass present in an oil scavenge line coupled to the bearing 16, through the debris sensor 42 placed in the scavenge line 19. The total debris mass may correspond to the metal that detached from either one of the bearing ball, cage, inner race, outer race, and seals etc.

As a further step, it is also possible to estimate a propagation of the bearing defect over the time, in order to estimate the bearing residual life.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method to monitor the health status of a rolling bearing of a machinery, the method comprising:
   a first acquiring step of a rotation speed value of a shaft coupled to the rolling bearing;
   a second acquiring step of a first signal generated by a vibration sensor located on the machinery in a position distant from the rolling bearing;
   a first calculating step of a variation of the shaft rotation speed value during a predetermined time interval and if the calculated variation of the rotation falls within a predetermined variation interval;
   obtaining a second signal representative of a bearing health status by performing a first filtering step of the first signal with a first algorithm based on a vibration produced by parts of the machinery different from the rolling bearing at the rotation speed value; and
   a step of assessing a total debris mass present in an oil scavenge coupled to the rolling bearing if a defect is detected, and further to estimate a propagation of the defect over time.

2. The method of claim 1, further comprising a first processing step of the second signal to obtain a third signal representative of the bearing health status.

3. The method of claim 2, wherein the first processing step comprises one or more steps selected from the group consisting of (i) a first amplification step to amplify frequencies with periodical behavior of the second signal thereby reducing noise, (ii) a first normalization step to regulate the strength of the different frequency components across different frequency bands, (iii) a second amplification step to amplify impulsive components of the second signal, (iv) a second filtering step performed with a pass-band algorithm, (v) a first signal decomposition step, and (vi) a first envelope spectral analysis.

4. The method of claim 2, further comprising a second processing step of the third signal to detect the presence of a defect pattern related to a bearing malfunction.

5. The method of claim 4, wherein the second processing step comprises a third filtering step to find threshold and apply by smoothing spectrum and/or a fourth filtering step to cancel shaft order components and/or a second noise removal step to retain only strong components of the signal, and/or a second analyzing step to find signal peaks.

6. The method of claim 4, wherein the second processing step comprises a first analyzing step wherein signal peaks are compared to known signal peaks, to detect the presence of a defect pattern related to a bearing malfunction.

7. The method of claim 6, wherein known signal peaks comprise a first group of signal peaks representative of a defect on an outer race of a bearing, and/or a second group of signal peaks representative of a defect on an inner race of a bearing, and/or a third group of signal peaks representative of a defect on at least a ball of a bearing.

8. The method of claim 7, wherein the known signal peaks are obtained from the analysis of malfunctioning bearing from an experimental setup or experimental field.

9. The method of claim 1, wherein the vibration sensor is selected from the group consisting of a piezo resistive sensor, a piezo electric sensor, an acoustic sensor, a capacitive sensor, an MEMS sensor, and a strain gauge sensor.

10. The method of claim 1, wherein the first first algorithm is based on a vibration produced by a machinery with a non-defective bearing.

11. A rolling bearing monitoring system comprising:
    a vibration sensor to monitor vibrations generated at least by the bearing; and
    a processing unit configured to process a signal acquired from the vibration sensor and to perform the steps of claim 1.

12. A machinery comprising a casing housing a shaft at least supported by a rolling bearing, a vibration sensor to monitor vibrations generated at least by the rolling bearing, a processing unit configured to process a signal acquired from the vibration sensor, the processing unit configured to perform the steps of claim 1.

13. A method to monitor the health status of a rolling bearing of a machinery, the method comprising:
    a first acquiring step of a rotation speed value of a shaft coupled to the rolling bearing;
    a second acquiring step of a first signal generated by a vibration sensor located on the machinery in a position distant from the rolling bearing;
    a first calculating step of a variation of the shaft rotation speed value during a predetermined time interval and if the calculated variation of the rotation falls within a predetermined variation interval;
    obtaining a second signal representative of a bearing health status by performing a first filtering step of the first signal with a first algorithm based on a vibration produced by parts of the machinery different from the rolling bearing at the rotation speed value; and
    a first processing step of the second signal to obtain a third signal representative of the bearing health status, wherein the first processing step comprises a second decomposition step to decompose the second signal into non-overlapping sub-band signals in the domain of frequency and/or a further step to set to zero, for each of the sub-band signals, the frequencies different from multiples of an expected ball spin frequency of the rolling bearing along with sidebands at multiples of an expected cage frequency of the rolling bearing in order to get a filtered sub-band signal and/or to set to zero, for each of the sub-band signals, the frequencies different from multiples of an expected inner or outer race frequency of the rolling bearing, and/or the expected cage frequency.

14. A method to monitor the health status of a rolling bearing of a machinery, the method comprising:
    a first acquiring step of a rotation speed value of a shaft coupled to the rolling bearing;
    a second acquiring step of a first signal generated by a vibration sensor located on the machinery in a position distant from the rolling bearing;
    a first calculating step of a variation of the shaft rotation speed value during a predetermined time interval and if the calculated variation of the rotation falls within a predetermined variation interval;
    obtaining a second signal representative of a bearing health status by performing a first filtering step of the first signal with a first algorithm based on a vibration produced by parts of the machinery different from the rolling bearing at the rotation speed value;
    a first processing step of the second signal to obtain a third signal representative of the bearing health status, the first processing step further comprising a second decomposition step to decompose the second signal into sub-band signals;
    filtering the sub-band signals to obtain filtered sub-band signals; and
    a second processing step of the third signal to detect the presence of a defect pattern related to a bearing malfunction, wherein the second processing step comprising a third analyzing step to compare each of the filtered sub-band signals with the sub-band signals in order to detect the presence of the defect pattern.

15. The method of claim 14, further comprising a step of generating an alarm if the defect pattern is detected.

\* \* \* \* \*